United States Patent
Tsuchiya

(10) Patent No.: US 7,926,722 B2
(45) Date of Patent: Apr. 19, 2011

(54) PRINTER AND IC CHIP COMMUNICATION APPARATUS

(75) Inventor: Motohito Tsuchiya, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 789 days.

(21) Appl. No.: 11/884,630

(22) PCT Filed: Mar. 2, 2006

(86) PCT No.: PCT/JP2006/303965
§ 371 (c)(1),
(2), (4) Date: Oct. 9, 2007

(87) PCT Pub. No.: WO2006/093219
PCT Pub. Date: Sep. 8, 2006

(65) Prior Publication Data
US 2008/0257964 A1  Oct. 23, 2008

(30) Foreign Application Priority Data
Mar. 3, 2005  (JP) .................................. 2005-059103

(51) Int. Cl.
*G06K 13/00*  (2006.01)
(52) U.S. Cl. ..................................... 235/475; 340/572.1
(58) Field of Classification Search .................. 235/451, 235/475, 477; 340/10.51, 572.1
See application file for complete search history.

(56) References Cited

U.S. PATENT DOCUMENTS

| | | | |
|---|---|---|---|
| 6,104,291 A * | 8/2000 | Beauvillier et al. ....... | 340/572.1 |
| 6,246,326 B1 * | 6/2001 | Wiklof et al. .............. | 340/572.1 |
| 7,439,865 B2 * | 10/2008 | Murofushi et al. ........ | 340/572.8 |
| 7,561,022 B2 * | 7/2009 | Bosco et al. ................. | 340/10.1 |
| 2001/0029857 A1 * | 10/2001 | Heredia et al. ................ | 101/288 |
| 2004/0141790 A1 * | 7/2004 | Waters .......................... | 400/611 |
| 2005/0252968 A1 * | 11/2005 | Tsujimura et al. ............ | 235/439 |
| 2005/0280537 A1 | 12/2005 | Feltz et al. | |
| 2006/0071063 A1 | 4/2006 | Duckett | |
| 2007/0200710 A1 | 8/2007 | Feltz et al. | |
| 2007/0245913 A1 * | 10/2007 | Sugiyama ..................... | 101/288 |
| 2008/0150720 A1 | 6/2008 | Feltz et al. | |
| 2008/0303722 A1 | 12/2008 | Feltz et al. | |
| 2009/0079648 A1 * | 3/2009 | Matsuo et al. ................ | 343/771 |

FOREIGN PATENT DOCUMENTS

EP  1 610 255 A1  12/2005

(Continued)

OTHER PUBLICATIONS

Chinese Office Action dated Feb. 27, 2009 (7 pages), and English translation thereof (4 pages) issued in counterpart Chinese Application No. 2006800069871.

Supplementary European Search Report dated Apr. 3, 2009, 7 pages, issued in counterpart European Application No. EP 06715074.8—2304.

(Continued)

*Primary Examiner* — Michael G Lee
*Assistant Examiner* — Suezu Ellis
(74) *Attorney, Agent, or Firm* — Patterson & Sheridan, LLP

(57) ABSTRACT

By rotating an antenna movable screw, an antenna fixing plate is vertically moved through the screw action, whereby the position of the antenna is changed. With this mechanism, the distance between the antenna and a transported label sheet can be adjusted according to a type of a label sheet (RF tag), whereby information can correctly be written to a tag corresponding to the type of various label sheets (RF tags).

15 Claims, 5 Drawing Sheets

FOREIGN PATENT DOCUMENTS

| | | |
|---|---|---|
| EP | 1 643 411 A1 | 4/2006 |
| JP | 2001-331768 A | 11/2001 |
| JP | 2003-076947 A | 3/2002 |
| JP | 2003-099721 A | 4/2003 |
| JP | 2003-300356 A | 10/2003 |

OTHER PUBLICATIONS

International Search Report and Written Opinion dated Mar. 28, 2006 in corresponding PCT/JP2006/303965, dated Mar. 28, 2006, 11 pages; English language International Search Report, 1 page.

* cited by examiner

PRINTER AND IC CHIP COMMUNICATION APPARATUS

This application is a U.S. National Phase Application under 35 USC 371 of International Application PCT/JP2006/303965 filed Mar. 2, 2006.

TECHNICAL FIELD

The present invention relates to a printer and an IC tag reading/writing apparatus that performs printing on a sheet or writes information to an IC tag serving as an IC chip and provided on this sheet.

BACKGROUND ART

There has been known a label printer that performs printing on a label sheet, which is wound around a roll-type continuous sheet and is provided with an IC tag, and that writes information to the IC tag of this label sheet. The IC tag provided on the label sheet, which is the subject in the label printer, is generally an RF (Radio Frequency) tag, wherein information is wirelessly written and read. In order to wirelessly write and read data to and from the RF tag, an antenna is necessary to the label sheet provided with the RF tag and the reader/writer of the RF tag.

Patent Reference 1: Japanese Unexamined Patent Publication No. 2001-331768

When information is written to the RF tag, there arises a problem that the information cannot be written well depending upon the difference in the frequency or the shape of the antenna, even if the position of the antenna in the label sheet and the position of the antenna of the reader/writer are the same.

There is another problem that, if the length of the label sheet on the continuous sheet formed into a roll is short, the space between the RF tag on the label sheet and the RF tag provided on the adjacent label sheet becomes narrow. Specifically, data might be written on the RF tag on the label sheet that is not the target one, so that there is a problem that the type of the usable label sheet with the RF tag is naturally limited.

In view of this, an object of the present invention is to provide a label printer, which performs printing to a label sheet provided with an IC tag and writes data to the IC tag, and which can cope with various types of label sheets.

DISCLOSURE OF THE INVENTION

A label printer according to the present invention includes a print head that performs printing to a sheet provided with an IC chip; a transporting device that transports the sheet on a transporting path; an antenna that mediates data communication with the IC chip provided on the sheet transported on the transporting path; and a mechanism for adjusting a distance between the antenna and the transporting path.

BEST MODE FOR CARRYING OUT THE INVENTION

One embodiment of the present invention will be explained with reference to FIGS. 1 to 7.

Figure 1:
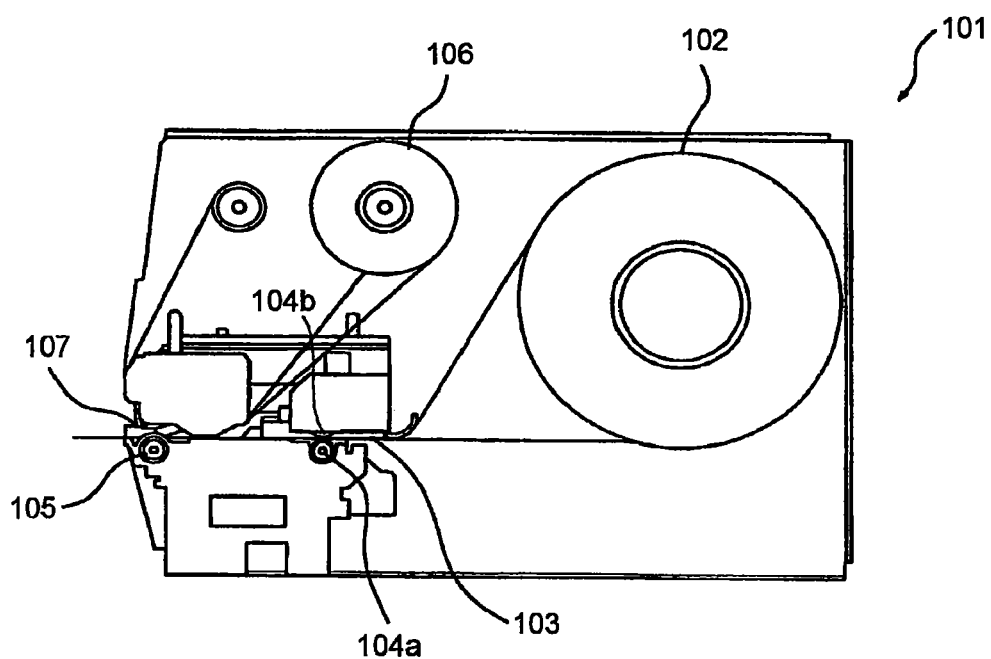
FIG. 1 is a longitudinal side view schematically showing a structure of a label printer according to one embodiment of the present invention.

FIG. 1 is a longitudinal side view schematically showing a structure of a label printer 101. As shown in FIG. 1, arranged in the label printer 101 are a pair of transport rollers 104a, 104b that serve as a transporting device for drawing a label sheet, which is wound in a roll fashion, from the rolled state so as to transport the label sheet 102 on a sheet transporting path 103, a platen roller 105, an ink ribbon 106, a thermal head 107 that is arranged so as to oppose to the platen roller 105 and prints predetermined items on the label sheet 102 with the use of the ink ribbon 106, etc. The thermal head 107 includes many resistance heat-generating members (not shown) arranged in a line. The ink ribbon 106 is inserted between the thermal head 107 and the label sheet 102. The thermal head 107 is in pressed contact with the platen roller 107, whereby the ink (not shown) on the ink ribbon 106 is transferred onto the label sheet 102 by the heat of the thermal head 107.

On the label printer 101, an RF tag reader/writer (not shown) is mounted that writes or reads information to or from RF (Radio Frequency) tags 6a and 7a (FIG. 2) provided on the label sheet 102 as an IC chip. The RF tag reader/writer is provided to an antenna unit 121 (FIG. 4), and connected to an antenna 1 that transmits and receives electric wave to the tags 6a and 7a (FIG. 2). The antenna unit 121 described above is arranged in the vicinity of the upstream side of the thermal head 107 in the transporting direction of the label sheet 102 and at the downstream side with respect to the transport roller 104.

Figure 2A:
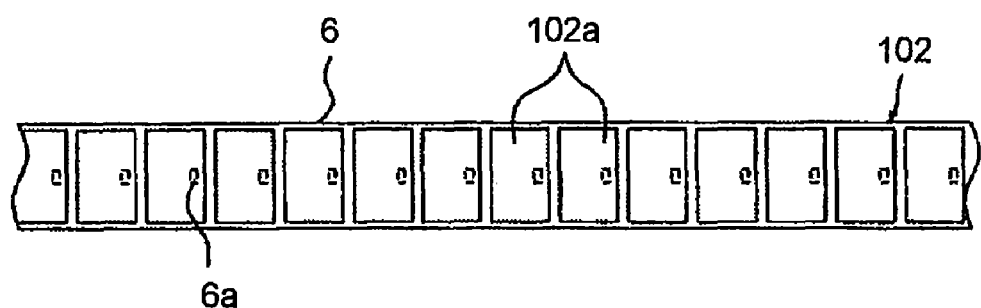
FIG. 2 is a plan view of a roll-type continuous sheet to which label sheets are attached.
Figure 2B:
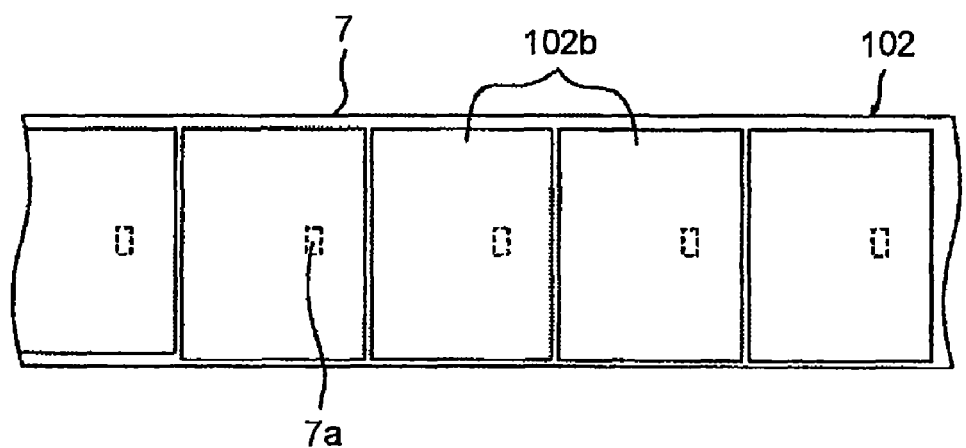
Figure 3:
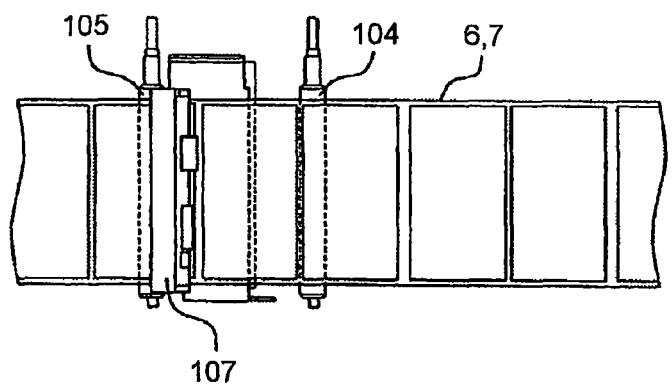
FIG. 3 is a plan view of a roll-type continuous sheet to which label sheets are attached, and which is transported to the position of a thermal head and a platen roller.

FIG. 2 is a plan view of the label sheet 102, and FIG. 3 is a plan view showing a positional relationship of the label sheet 102 that is transported to the thermal head 107 and the platen roller 105 by the transport rollers 104a, 104b. FIG. 2(a) and FIG. 2(b) respectively illustrate a label sheet 102 having a different size, wherein label sheets 102a and 102b are formed at regular intervals on continuous sheets 6 and 7 wound in a rolled fashion. Numerals 6a and 7a are RF tags formed on the label sheets 102a and 102b respectively.

Figure 4:
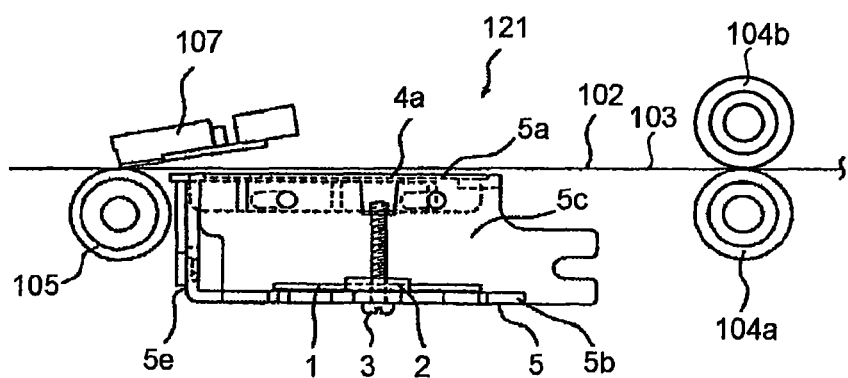
FIG. 4 is a longitudinal sectional view of a portion of an antenna unit in the label printer.
Figure 5:
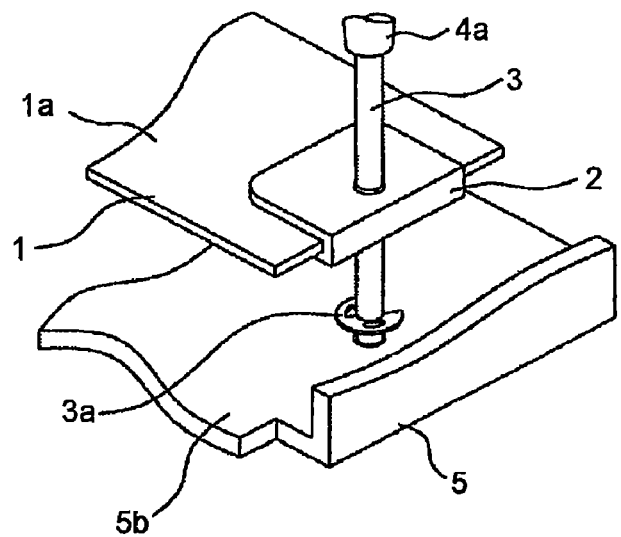
FIG. 5 is a perspective view of the same portion.
Figure 6:
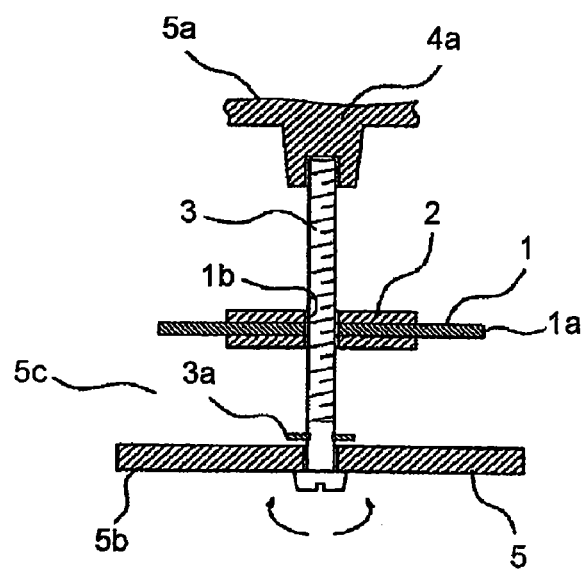
FIG. 6 is a longitudinal sectional view of the same portion.

Subsequently, the antenna unit 121 will be explained. FIG. 4 is a longitudinal sectional view of the antenna unit 121, FIG. 5 is a perspective view showing a portion of the antenna unit 121, and FIG. 6 is a longitudinal sectional view of the same portion.

Figure 7:
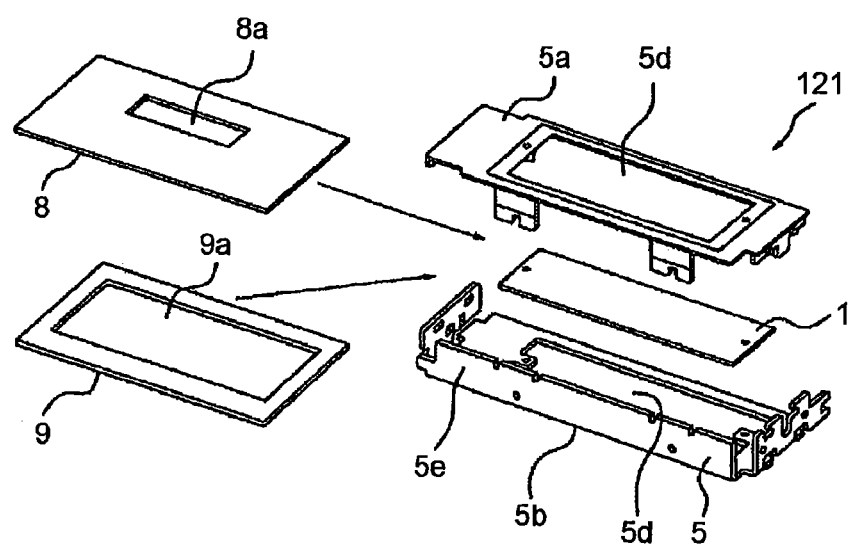
FIG. 7 is an exploded perspective view of each section of an RF tag reader/writer.

A mechanism for adjusting the distance between the antenna 1 provided to the antenna unit 121 and the sheet transporting path 103 will be explained. The antenna 1 has a structure in which a support plate 1a supports a coil (not shown). The support plate 1a of the antenna 1 is arranged below (at the side of the platen) the label sheet 102 that is guided and transported on the sheet transporting path 103, and formed long in the widthwise direction of the label sheet 102. The mechanism for adjusting the distance provided to the antenna unit 121 is composed of a mechanism for elevating the support plate 1a of the antenna 1. Specifically, antenna fixing plates 2 are fixed to both ends of the support plate 1a. The antenna fixing plates 2 are configured such that two plates are opposite to each other with a gap capable of sandwiching the support plate 1a of the antenna 1, and have a slit shape in which the side opposite to the side of sandwiching the support plate 1a is closed. Since the antenna fixing plates 2 having the slit shape hold both ends of the support plate 1a in the widthwise direction of the label sheet 102, the antenna fixing plates 2 are fixed to the support plate 1a. The antenna unit 121 has a frame 5 that forms a space 5c between an upper member 5a and a lower member 5b. Further, an opening 5d is formed on the upper member 5a and the lower member 5b of the frame 5 as shown in FIG. 7. A rising member 5e that is formed by bending a metal plate from the lower member 5b and serves as a second shielding member is formed at the frame 5 at the side of the platen. This rising member 5e is provided in order to prevent data from being written again after the printing onto the label sheet on which data has already been written.

A pair of movable screws 3 is attached to the frame 5 so as to rotate about the axis of the movable screw 3, and the support plate 1a of the antenna 1 is attached to the movable screws 3. Specifically, a pair of screw holes 1b is formed to the support plate 1a of the antenna 1 and the antenna fixing plates 2, and the movable screws 3 are screwed to the screw holes 1b. The movable screw 3 is rotatably provided to the frame 5 in such a manner that the movable screw 3 penetrates the lower member 5b of the frame 5 from below, and is prevented by a screw come-off preventing member 3a from coming off, and the leading end thereof is fitted to a boss 4a provided at the upper member 5a of the frame 5. An E-ring that can detachably be provided to the movable screw 3 is employed as the screw come-off preventing member 3a, for example. Therefore, in the example of the mechanism for adjusting the distance, by rotating the movable screws 3, the position of the antenna fixing plates 2 can be vertically moved by the screw action. Specifically, since the position of the antenna 1 changes to the sheet transporting path 103, the distance between the antenna 1 and the label sheet 102 can be changed.

With this mechanism, the distance between the antenna 1 and the label sheet 102a (or 102b), which is drawn from the rolled state and transported, can be adjusted depending upon the type of the label sheets 102a and 102b (tags 6a and 7a). For example, even if the frequency band of RFID is UHF band, 902 to 928 MHz can be used in the United States, and 866 to 870 MHz can be used in Europe. In other words, the usable frequency band is different. Therefore, when the antenna 1 is attached to the position where data is always correctly written in the frequency of one district, the data might not correctly be written when the data is written to the tag having a frequency according to the other district. The frequency in which the data cannot be written is unallowable degree as an actual product. However, according to one embodiment for solving this problem, information can correctly be written to the tags 6a and 7a corresponding to various types of the label sheets 102a and 102b (tags 6a and 7a).

FIG. 7 is an exploded perspective view of each section of the antenna unit 121. In this antenna unit 121, either one of partitioning plates 8 and 9 formed of a sheet metal is provided at the middle position between the antenna 1 and the boss 4a. The partitioning plates 8 and 9 are formed with rectangular through-holes 8a and 9a at the central portion, respectively. The through-holes 8a and 9a are different from each other in size. The partitioning plates 8 and 9 are provided between the antenna 1 and the label sheet 102a or 102b that is drawn out from the rolled state to be transported on the sheet transporting path 103, and serves as a shielding member that blocks electric wave transmitted from the antenna 1 from reaching the position other than the target direction so as to limit the range of writing the information to the tags 6a and 7a by the antenna 1.

Specifically, only the electric wave passing through the through-holes 8a and 9a contributes to the writing of the information of the tags 6a and 7a, so that there is no chance that the information is written to another label sheet 102a or 102b.

The partitioning plate 8 or 9 is selected depending upon which one of the label sheet 102a and the label sheet 102b is used, whereby the narrow through-hole 8a or wide through-hole 9a can be selected, and hence, optimum information writing can be performed according to the type of the label sheet 102.

In one embodiment described above, the antenna fixing plates 2 are moved vertically by the screw action by rotating the antenna movable screws 3, as the structure for changing the position of the antenna 1. However, the antenna movable screws 3 may not be used, and a detachable structure for screwing the antenna fixing plates 2 for fixation at plural positions including the position relatively close to the transported label sheet 102 and the position relatively far from the transported label sheet 102 may be provided, whereby the antenna 1 is fixed to the position relatively close to the transported label sheet or the position relatively far from the transported label sheet 102.

In the case of the aforesaid UHF band, the antenna 1 is attached close to the lower member 5b in the product for the United States, while the antenna 1 is attached close to the upper member 5a in the product for Europe. The optimum space between the attachment position of the antenna 1 in the product for the United States and the attachment position of the antenna 1 in the product for Europe is about 5 mm. Specifically, the antenna 1 is attached to the close position generally in contact with the sheet transporting path 103 in the product for Europe, while the antenna 1 is attached to the position apart from the sheet transporting path 103 by about 5 mm in the product for the United States.

The shape of the antenna 1 is not specifically described in the present application, but the shape of the antenna 1 varies since the frequency to be handled is different. Therefore, in the present embodiment, the attachment position of the antenna 1 is determined according to the shape of the antenna 1. Specifically, since there are plural shapes of the antennas 1, the attachment position is determined according to the respective antennas 1, whereby the antenna 1 can easily be attached to the optimum attachment position.

The invention claimed is:

1. A printer comprising:
   a print head that performs printing to a sheet provided with an IC chip;
   a transporting device that transports the sheet on a transporting path;
   an antenna that provides data communication with the IC chip provided on the sheet transported on the transporting path;
   a mechanism for adjusting a distance between the antenna and the transporting path; and
   a plurality of first shielding members that are detachably provided between the antenna and the transporting path, each of the first shielding members having a different sized through-hole through which an electric wave transmitted from the antenna passes.

2. The printer according to claim 1, wherein each of the first shielding members shields the electric wave transmitted from the antenna, to limit the data communication range of the antenna to the IC chip.

3. The printer according to claim 2, further comprising a metallic frame that includes: an upper member, which has an opening through which the electric wave from the antenna passes and forms a part of the transporting path; and a lower member, which is positioned below the upper member via a space into which the antenna is positioned, the metallic frame being arranged at an upstream side of the transporting path with respect to the print head, wherein:

each of the first shielding members is made of a metal plate that is detachably provided with the upper member.

4. The printer according to claim 3, wherein the lower member has an opening at the position facing the antenna.

5. The printer according to claim 1, further comprising a second shielding member that is provided between the antenna and a position at a downstream side of the transporting path with respect to the antenna, to shield the electric wave transmitted from the antenna.

6. The printer according to claim 5, further comprising a metallic frame that includes: an upper member, which has an opening through which the electric wave from the antenna passes and forms a part of the transporting path; and a lower member, which is positioned below the upper member via a space into which the antenna is positioned, the metallic frame being arranged at an upstream side of the transporting path with respect to the print head, wherein:

the second shielding member is made of a part of the frame.

7. The printer according to claim 6, wherein the lower member has an opening at a position facing the antenna.

8. The printer according to claim 1, wherein the mechanism for adjusting the distance includes:

a support plate for supporting the antenna;
a screw hole formed on the support plate; and
a movable screw that is screwed into the screw hole and is arranged so as to adjust a distance between the antenna and the transporting path.

9. The printer according to claim 8, wherein the support plate has an antenna fixing plate at the portion of the screw hole.

10. The printer according to claim 1, wherein the mechanism for adjusting the distance includes:

a support plate for supporting the antenna; and
a structure in which the support plate is detachably attached at plural attachment positions for varying the distance between the antenna and the transporting path.

11. The printer according to claim 1, wherein the print head is a line-type thermal head that is in contact with a platen roller via the transporting path.

12. The printer according to claim 11, wherein the thermal head is arranged at a downstream side of the transporting path with respect to the antenna.

13. The printer according to claim 11, wherein:

the transporting device has a pair of transport rollers that are in contact with each other via the transporting path at an the upstream side of the transporting path with respect to the platen roller, at least one of the pair of transport rollers being rotatably driven; and the antenna is arranged between the transport roller and the platen roller.

14. The printer according to claim 1, wherein the sheet is a label sheet comprising a plurality of labels and wound in a rolled fashion.

15. An IC chip communication apparatus comprising:

an antenna that provides data communication with an IC chip provided on a sheet;

a transporting device that guides and transports the sheet on a transporting path to the position where the antenna provides the data communication with the IC chip;

a mechanism for adjusting a distance between the antenna and the transporting path; and a plurality of shielding members that are detachably provided between the antenna and the transporting path, each of the shielding members having a different sized through-hole through which an electric wave transmitted from the antenna passes.

* * * * *